United States Patent [19]

Danowski et al.

[11] Patent Number: 5,076,920
[45] Date of Patent: Dec. 31, 1991

[54] ELECTROSTATICALLY DISSIPATIVE FUEL FILTER

[75] Inventors: Daniel R. Danowski, Richmond, R.I.; Sunil K. Kesavan, Troy, Mich.; James W. Martin; James S. Pereira, both of Rehoboth, Mass.

[73] Assignee: Allied-Signal Inc., Morristown, N.J.

[21] Appl. No.: 575,260

[22] Filed: Aug. 30, 1990

[51] Int. Cl.5 ............... B01D 27/08; B01D 35/02; B01D 35/06
[52] U.S. Cl. ................ 210/243; 210/446; 210/493.5; 361/215
[58] Field of Search ........... 210/748, 243, 446, 493.5; 361/215

[56] References Cited

U.S. PATENT DOCUMENTS

| | | | |
|---|---|---|---|
| 3,186,551 | 6/1965 | Dornauf | 210/243 |
| 3,933,643 | 1/1976 | Colvin et al. | 210/243 |
| 4,187,179 | 2/1980 | Harms | 210/243 |

Primary Examiner—Stanley S. Silverman
Assistant Examiner—Neil M. McCarthy
Attorney, Agent, or Firm—Ken C. Decker; William N. Antonis

[57] ABSTRACT

A fuel filter for a motor vehicle includes a housing made of a base Nylon 12 material to which are added stainless steel fibers to render the housing electrically conductive while retaining moldability. The electrically conductive housing permits charges generated by the fuel passing through the filtering media to be dissipated to the vehicle body, thereby preventing erosion of the housing and subsequent leaks.

10 Claims, 1 Drawing Sheet

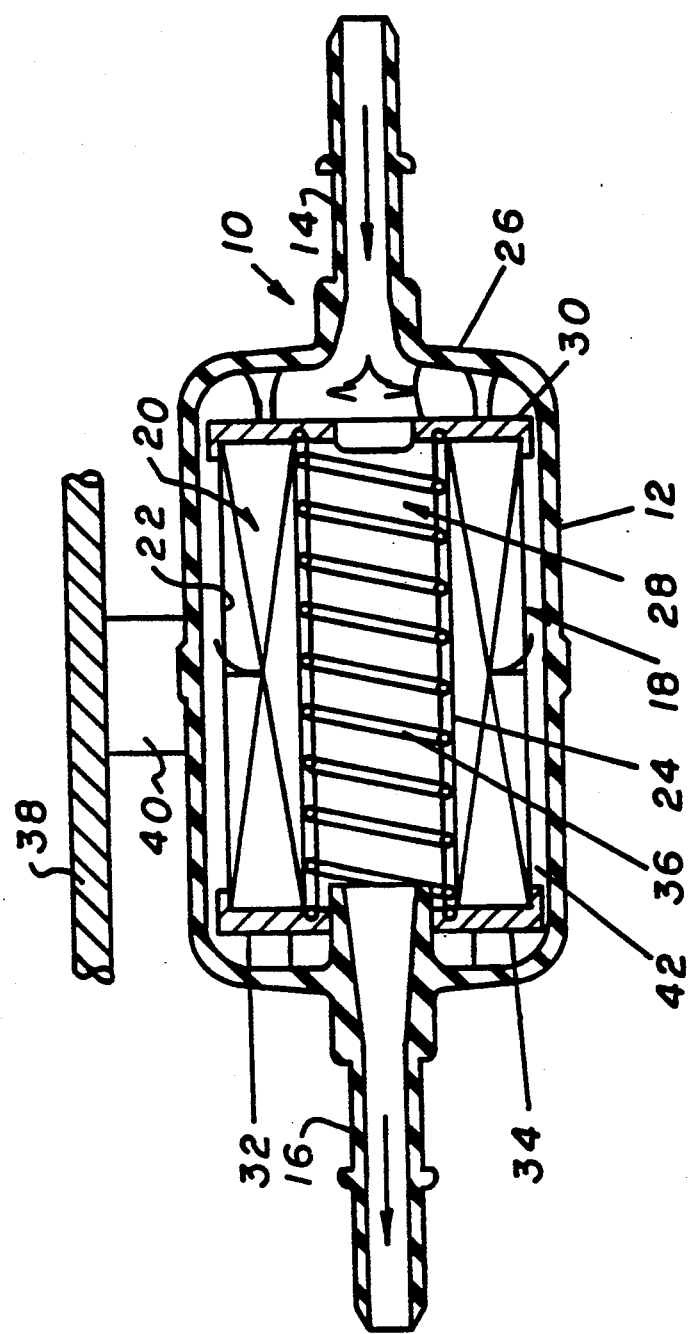

ELECTROSTATICALLY DISSIPATIVE FUEL FILTER

This invention relates to a fuel filter for use in the fuel line that delivers fuel to a motor vehicle engine.

The housings for filters used to filter the fuel delivered to a motor vehicle engine have commonly been made of metal or a polymer material, such as Nylon 12. Because of their inherently lower cost and other advantages, non-metallic fuel filters are preferred. Such non-metallic fuel filters have been commonly used on vehicles having carbureted engines without problems for many years. However, when such prior art non-metallic fuel filters were used on vehicles equipped with electronic fuel injection (EFI) systems, the non-metallic material occasionally broke down and started leaking. Since leaking fuel in the hot engine compartment of a motor vehicle is extremely dangerous, any leakage from a fuel filter is unacceptable. Accordingly, metallic filters have been used in vehicle equipped with electronic fuel injection systems.

According to the present invention, it has been discovered that the material used in prior art non-metallic filters for electronic fuel injection fuel systems broke down and began leaking due to electrostatic buildup within the filter. Although the generation of electrical charges in hydrocarbon systems has been a recognized phenomena, it has been of little concern in the past, because the metallic components used in prior art systems provided an electrical path for the electrical charges to move freely to the grounded vehicle body. However, with non-conductive systems in which both the tubing and the filter are made from a non-conductive material, the pathway has been removed, leaving no way for the charges to drain to ground.

According to the present invention, a fuel filter for a motor vehicle is made from a moldable material which may be safely used in vehicles equipped with electronic fuel injection system. This and other advantages of the present invention will become apparent from the following description, with reference to the accompanying drawing, the sole Figure of which is a cross-sectional view of a fuel filter made pursuant to the teachings of the present invention and its attachment to an associated automotive body.

Referring now to the drawing, a fuel filter generally indicated by the numeral 10 includes a housing 12 which is manufactured from a material which is non-conductive, such as Nylon 12 or another polymer material to which a conductive filler has been added, as will hereinafter be described. The housing 12 is equipped with an inlet fitting 14 and outlet fitting 16. The inlet fitting 14 and outlet fitting 16 are connected into the fuel line which delivers fuel from the fuel tank to the engine. The fuel line may also be made of a non-conductive material.

A filter element generally indicated by the numeral 18 is mounted within the housing 12 to filter fuel communicated through the fuel line. Element 18 includes a conventional circumferentially extending array of pleated filter media generally indicated by the numeral 20. The pleats forming the filtering media 20 define outer tips 22 and inner tips 24. A closed end cap 26 closes the end of the element 18 adjacent to inlet fitting 14 and bridges across the inner cavity 28 defined within the array of media 20. A circumferentially extending band of sealing material 30 is dispensed into the end cap 26, and seals the edges of the pleats comprising the media 20 to prevent bypass of fuel around the ends of the pleats. A corresponding circumferentially extending band of sealing material 32 is dispensed in end cap 34 which closes the opposite end of the inner cavity 28. The sealing material 32 seals the opposite edges of the pleats comprising the media 20. The outlet fitting 16 extends through the end cap 34 to communicate with the inner cavity 28. A spring 36 is disposed in the inner cavity 28 and engages the inner tips 24 of the media 20 to prevent inward collapse of the media. The housing 12 is secured to the metal vehicle body, a portion of which is indicated at 38, by a bracket 40. The bracket 40 may be either a separate metallic member attached to the housing 12 or molded as a part of the housing 12 from the same material used for the housing 12. Accordingly, fuel communicated into the inlet fitting 14 is received in inlet cavity 42 which is defined between the element 18 and the housing 12. Fuel in the inlet cavity 42 communicates through the media 20 into the inner or outlet cavity 28 which is communicated directly with the outlet fitting 16.

As the fuel communicates through the media 20 from inlet cavity 42 to the inner or outlet cavity 28, electrical charges are generated, regardless of the type of media used. Although the media 20 is most commonly a pleated paper media, other materials might be used. As the hydrocarbon paraffin passes through the filter media, electrons are stripped from the outer shell of the paraffin as a result of the impact between the paraffin and the media. Accordingly, the hydrocarbon molecules in the cavity 28 are positively charged, and an excess of electrons is present in the inlet cavity 42, so that hydrocarbon molecules in the inlet cavity take on the characteristics of a negatively charged molecule or ion. Thus the fuel in the inlet cavity 42 becomes negatively charged. Although some electrical charge generation occurs in the fuel lines upstream and downstream of the filter due to stripping of electrons due to friction between the fuel and the walls of the fuel line, the charge generation due to the impact of the hydrocarbon paraffin against the media 20 may be as much as several orders of magnitude higher than the generation taking place in the lines themselves.

The magnitude of the charge generated in the inlet cavity 42 will also be a function of the flow rate through the housing 12. In fact, as studies have shown, the charge generation in the inlet chamber 42 is almost directly proportional to the flow rate through the filter media 20. Accordingly, fuel filters used in recirculatory fueling systems, such as electronic fuel injection systems where flows through the fuel line are substantially higher than flows in older carbureted systems, will generate a proportionally higher charge level in the inlet chamber 42.

Under undisturbed conditions, the charge generated in the inlet cavity 42 would be evenly distributed about the filter. Accordingly, the charge would then be evenly dissipated or passed through the filter. However, when a grounding plane is within "striking distance" of the electrostatic charge in the inlet cavity 42, a discharge takes place from the portion of housing 12 closest to the plane 38 whenever the charges in the cavity 42 exceed the strength of the dielectric between the inlet cavity 42 through the housing 12 to the grounding plane. In this case, the grounding plane is provided by the body of the vehicle indicated at 38.

Although the body of a motor vehicle is commonly considered to be "grounded", the grounding is effected by connecting the body to the negative terminal of the vehicle battery. This provides a grounding plane that is slightly positive with respect to an earth ground. Since the grounding plane provided by the body 38 is slightly positive, the charges in the inlet cavity 42 will be attracted towards the body 38. Accordingly, the charges will be concentrated in that part of the cavity 42 closest to the body 38. Tests have shown that electrical charges move around a curved body, such as the housing 12, much more easily than in bodies having other shapes. Accordingly, the voltage level of an electrostatic charge in that portion of the inlet chamber 42 closest to the body 38 may be as high as 8 kV to 10 kV. Since the dielectric strength between the cavity 42 and the body 38 is approximately 7 kV, the dielectric begins to allow the charge to pass through the material of the housing 12 when the voltage level of the electrostatic charge exceeds 7 kV. Accordingly, the material of which the housing 12 is made is required to absorb a portion of the energy associated with the charge. If the charge was evenly distributed about the housing 12, the strength of the material would exceed the absorption energy during the lifetime of the filter, but as discussed above, most of the charge is concentrated in that part of the cavity 42 closest to the body 38. When a grounding plane, such as the body 38, is within "striking" distance of a charged body, the plane itself is a target for electron current flow. The energy which makes up the charge will then no longer pass through the body in an evenly distributed manner. This absorption of energy breaks down the material of which the housing 12 is made and results in microscopic pin holes in the housing 12. When a large concentration of these pin holes occurs in a small area, the material comprising the housing 12 breaks down and the housing leaks. Tests have shown that the striking distance is always less than or equal to the radius of the curved body.

According to the present invention, an electrically conductive path is provided between the fuel within the inlet cavity 42 and the body 38. Accordingly, the electrostatic buildup in the cavity 42 will be discharged through the electrically conductive path in bracket 40 to the body 38, thus avoiding the aforementioned material erosion that causes leaks. An electrical path through the housing 12 is most easily provided by incorporating small amounts of a conductive filler material in the base Nylon 12 material, thus making the housing electrically conductive while substantially retaining the moldability and other desirable properties of the polymer material.

Since the filler material must be chemically resistant to the fuel in the housing 12, a filamentary stainless steel fiber product with a high aspect ratio was selected as the filler material. Stainless steel also has the advantage of requiring smaller quantities for providing the required conductivity than other conductive fillers, such as carbon black, metal flakes and powders, and metallized microspheres which possess small aspect ratios. Stainless steel fibers used in this application have a preferable upper limit on fiber diameter of about 8 microns. This small diameter, coupled with the low loadings of filler used, allows the matrix to stretch freely between and around fibers as long as the filler is properly compounded into the base resin. This reduces dewetting and disbonding between the filler and base resin, thus preventing cavitation under stress. Stainless steel also presents itself as a filler around which the base Nylon 12 material bonds to itself. Other electrically conductive fillers, such as the aforementioned carbon, act as stress concentrators and, at the relatively high filler loadings required to achieve conductivity, restrict the ability of the resin matrix to yield under stress. Also, the stainless steel fibers are ductile and non-rigid unlike straight or metallized carbon fibers or metallized inorganic fibers and whiskers. This allows stainless steel fibers to maintain their integrity better during melt-processing. Unlike the non-metallic fibers, stainless steel fibers also do not increase mechanical strength or stiffness of the base resin significantly. Other metal fibers with high aspect ratios can be satisfactorily substituted for stainless steel.

The aspect ratio of the stainless steel fibers used must be large enough to easily conduct electricity at low loadings, but small enough to be easily molded with the base polymer material into the final part. Accordingly, stainless steel fibers having a diameter of about 8 microns and a nominal length of from 4–6 mm were selected. Longer steel fibers can also be used depending on design of the filter. The longest fiber length dictated by part design and moldability should be used in order to minimize filler usage. The stainless steel in the composite material is about 3% to 9% by weight, of the composite material, which is sufficient to provide a density of about 8 grams of stainless steel fibers per cubic centimeter of material, which provides volume and surface resistivities in the $1 \times 10^2$ to $1 \times 10^6$ range in ohm units (surface resistivity) and ohm-cm units (volume resistivity).

In order to assure moldability and compatibility between the stainless steel fibers and the base Nylon 12 material, the stainless steel fibers should preferably be coated with small amounts of coupling agents like organofunctional silane or titanate compounds. Alternately, graft or block copolymers with amide functional groups can also be used as coupling agents. Also, small amounts of polymers with affinity for metal surfaces and having good compatibility with polyamides can be used. These interfacial agents help in wetting and increasing interfacial bonding through formation of molecular metal-polymer matrix bridges In addition to coupling agents, mold-release agents, internal lubricants, and impact modifiers can be used to improve physical properties of the stainless-fiber filled resin.

We claim:

1. Method of preventing material breakdown of a housing of a fuel filter for filtering fuel flowing through a fuel line delivering fuel to the engine of a motor vehicle, said motor vehicle having a common electrical plane maintained at a common electrical potential, said housing defining a chamber therewithin and having an inlet and an outlet connected in said fuel line and communicating with said chamber, said housing being primarily composed of an electrically non-conductive material, comprising the step of providing an electrically conductive path between the fuel within the chamber and said common electrical plane by providing electrically conductive material in the electrically non-conductive material of said housing so that at least a portion of said electrically conductive path extends through the housing to thereby prevent the build-up of electrostatic charge in the fuel and resulting arcing which causes the breakdown of the housing.

2. Method of preventing material breakdown as claimed in claim 1, wherein said electrically conductive path is provided by embedding an electrically conductive material in the electrically non-conductive material of said housing.

3. Method of preventing material breakdown as claimed in claim 1, wherein said electrically conductive path is provided by embedding electrically conductive fibers in the electrically non-conductive material of said housing.

4. Method of preventing material breakdown as claimed in claim 1, wherein said electrically non-conductive material is a polymer material and the electrically conductive path is provided by embedding electrically conductive fibers in the polymer material.

5. Method of preventing material breakdown as claimed in claim 4, wherein said fibers are stainless steel fibers.

6. Method of preventing material breakdown as claimed in claim 5, wherein said stainless steel fibers comprise at least 3% to 9% by weight of the composite material.

7. Method of preventing material breakdown as claimed in claim 6, wherein said stainless steel fibers have a minimum length of about 4 mm.

8. Method of preventing material breakdown as claimed in claim 4, wherein a filtering media within said chamber divides the chamber into an inlet section communicated with said inlet and an outlet section communicated with said outlet, said electrically conductive path extending between the fuel in said inlet section and the common electrical plane.

9. Method of preventing material breakdown as claimed in claim 2, wherein a filtering media within said chamber divides the latter into an inlet section communicated with said inlet and an outlet section communicated with said outlet, said electrically conductive path extending between the fuel in said inlet section and the common electrical plane.

10. Method of preventing material breakdown as claimed in claim 1, wherein a filtering media within said chamber divides the chamber into an inlet section communicated with said inlet and an outlet section communicated with said outlet, said electrically conductive path extending between the fuel in said inlet section and the common electrical plane.

* * * * *

REEXAMINATION CERTIFICATE (2929th)
United States Patent
Danowski et al.

[11] B1 5,076,920
[45] Certificate Issued Jun. 25, 1996

[54] ELECTROSTATICALLY DISSIPATIVE FUEL FILTER

[75] Inventors: Daniel R. Danowski, Richmond, R.I.; Sunil K. Kesavan, Troy, Mich.; James W. Martin; James S. Pereira, both of Rehoboth, Mass.

[73] Assignee: Allied-Signal Inc., Morris Township, Morris County, N.J.

Reexamination Request:
No. 90/003,278, Dec. 13, 1993

Reexamination Certificate for:
Patent No.: 5,076,920
Issued: Dec. 31, 1991
Appl. No.: 575,260
Filed: Aug. 30, 1990

[51] Int. Cl.⁶ .......................... B01D 27/08; B01D 35/02; B01D 35/06
[52] U.S. Cl. .......... 210/243; 210/446; 210/493.5; 361/215
[58] Field of Search .................. 210/243, 446, 210/493.5; 361/215

[56] References Cited

U.S. PATENT DOCUMENTS

| | | |
|---|---|---|
| 2,053,114 | 9/1936 | Sinks. |
| 2,108,759 | 2/1938 | Turman. |
| 2,138,256 | 11/1938 | Schuyler. |
| 2,152,588 | 3/1939 | Griesemer. |
| 2,263,221 | 11/1941 | Merrill. |
| 3,004,670 | 10/1961 | Zonker. |
| 3,166,688 | 1/1965 | Rowland et al. |
| 3,233,737 | 2/1966 | Hultgren. |
| 3,295,684 | 1/1967 | Webb. |
| 3,334,747 | 9/1967 | Niccum et al. |
| 3,473,087 | 10/1969 | Slade. |
| 3,520,110 | 7/1970 | Knauer. |
| 3,907,955 | 9/1975 | Viennot. |
| 3,929,641 | 12/1975 | Dukek. |
| 4,005,339 | 1/1977 | Plantard. |
| 4,215,384 | 7/1980 | Elson. |
| 4,319,303 | 3/1982 | Thom. |
| 4,420,396 | 12/1983 | Yamamoto et al. |
| 4,540,191 | 9/1985 | Hoch. |
| 4,613,922 | 9/1986 | Bachmann. |
| 4,870,535 | 9/1989 | Matsumoto. |
| 4,985,801 | 1/1991 | Hellard et al. |
| 4,999,108 | 3/1991 | Koch et al. |
| 5,076,920 | 12/1991 | Danowski et al. |
| 5,081,326 | 1/1992 | Usui. |
| 5,085,801 | 2/1992 | Thierry et al. |
| 5,108,270 | 4/1992 | Kozumplik, Jr. |
| 5,164,084 | 11/1992 | Danowski et al. |

OTHER PUBLICATIONS

Generation of Electrostatic Charge in Fuel Handling Systems: A Literature Survey J. T. Leonard–Naval Research Laboratory Sep. 24, 1981.

Standard Guide for Generation and Dissipatin of Static Electricity Petroleum Fuel Systems ASTM Standards D 4865-88.

Electric Currents and Potentials Resulting From the Flow of Charged Liquid Hydrocarbons Through Short Pipes M. R. Shafer, D. W. Baker and K. R. Benson Jun. 21, 1965.

*Primary Examiner*—Neil McCarthy

[57] ABSTRACT

A fuel filter for a motor vehicle includes a housing made of a base Nylon 12 material to which are added stainless steel fibers to render the housing electrically conductive while retaining moldability. The electrically conductive housing permits charges generated by the fuel passing through the filtering media to be dissipated to the vehicle body, thereby preventing erosion of the housing and subsequent leaks.

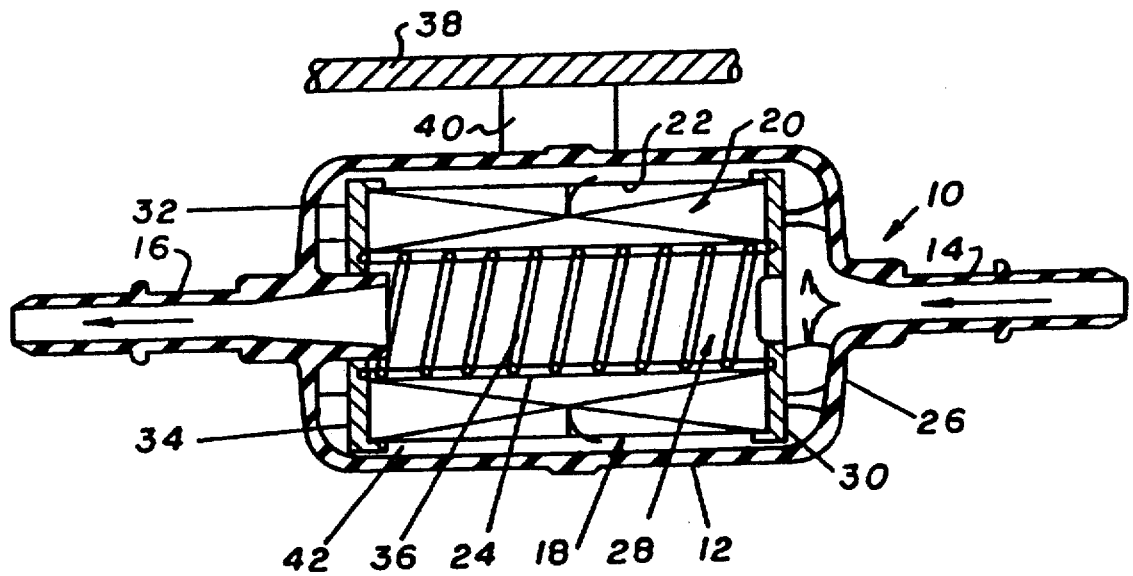

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4 are determined to be patentable as amended.

Claims 5–10, dependent on an amended claim, are determined to be patentable.

1. Method of preventing material breakdown of a housing of a fuel filter for filtering fuel flowing through a fuel line delivering fuel to the engine of a motor vehicle, said motor vehicle having a common electrical plane maintained at a common electrical potential, said housing defining a chamber therewithin and having an inlet and an outlet connected in said fuel line and communicating with said chamber, said housing being primarily composed of an electrically non-conductive material, comprising the step of providing an electrically conductive path between the fuel within the chamber and said common electrical plane by providing electrically conductive material in the electrically non-conductive material of said housing so that *the electrically conductive material extends completely through the housing such that* at least a portion of said electrically conductive path extends through the housing to thereby prevent the build-up of electrostatic charge in the fuel and resulting arcing which causes the breakdown of the housing.

2. Method of preventing material breakdown as claimed in claim 1, wherein said electrically conductive path is provided by embedding [an] *the* electrically conductive material in the electrically non-conductive material of said housing.

3. Method of preventing material breakdown as claimed in claim 1, wherein said electrically conductive path is provided by embedding *the electrically conductive material in the form of* electrically conductive fibers in the electrically non-conductive material of said housing.

4. Method of preventing material breakdown as claimed in claim 1, wherein said electrically non-conductive material is a polymer material and the electrically conductive path is provided by embedding *the electrically conductive material in the form of* electrically conductive fibers in the polymer material.

* * * * *

REEXAMINATION CERTIFICATE (3506th)
United States Patent
Danowski et al.

[11] B2 5,076,920
[45] Certificate Issued May 5, 1998

[54] ELECTROSTATICALLY DISSIPATIVE FUEL FILTER

[75] Inventors: Daniel R. Danowski, Richmond, R.I.; Sunil K. Kesavan, Troy, Mich.; James W. Martin; James S. Pereira, both of Rehoboth, Mass.

[73] Assignee: Allied-Signal Inc., Morris Township, Morris County, N.J.

Reexamination Request:
No. 90/004,541, Feb. 7, 1997

Reexamination Certificate for:
Patent No.: 5,076,920
Issued: Dec. 31, 1991
Appl. No.: 575,260
Filed: Aug. 30, 1990

Reexamination Certificate B1 5,076,920 issued Jun. 25, 1996

[51] Int. Cl.$^6$ .............. B01D 27/08; B01D 35/02; B01D 35/06
[52] U.S. Cl. .............. 210/243; 210/446; 210/493.5; 361/215
[58] Field of Search .............. 210/243, 446, 210/493.5, 748; 361/215

[56] References Cited
U.S. PATENT DOCUMENTS

| | | |
|---|---|---|
| 3,004,670 | 10/1961 | Zonker . |
| 3,233,737 | 2/1966 | Hultgren . |
| 3,334,747 | 8/1967 | Niccum et al. . |
| 4,675,143 | 6/1987 | Wakita et al. . |
| 5,076,920 | 12/1991 | Danowski et al. . |
| 5,108,270 | 4/1992 | Kozumplik, Jr. . |

FOREIGN PATENT DOCUMENTS

| | | |
|---|---|---|
| U-50-77878 | 7/1975 | Japan . |
| A-61-8102 | 1/1986 | Japan . |
| U-63-54859 | 4/1988 | Japan . |

OTHER PUBLICATIONS

Shafer, M.R. et al., "Electric Current and Potentials Resulting From the Flow of Charged Liquid Hydrocarbons Through Short Pipes", Journal of Research, Dec., 1965.

*Primary Examiner*—Neil McCarthy

[57] ABSTRACT

A fuel filter for a motor vehicle includes a housing made of a base Nylon 12 material to which are added stainless steel fibers to render the housing electrically conductive while retaining moldability. The electrically conductive housing permits charges generated by the fuel passing through the filtering media to be dissipated to the vehicle body, thereby preventing erosion of the housing and subsequent leaks.

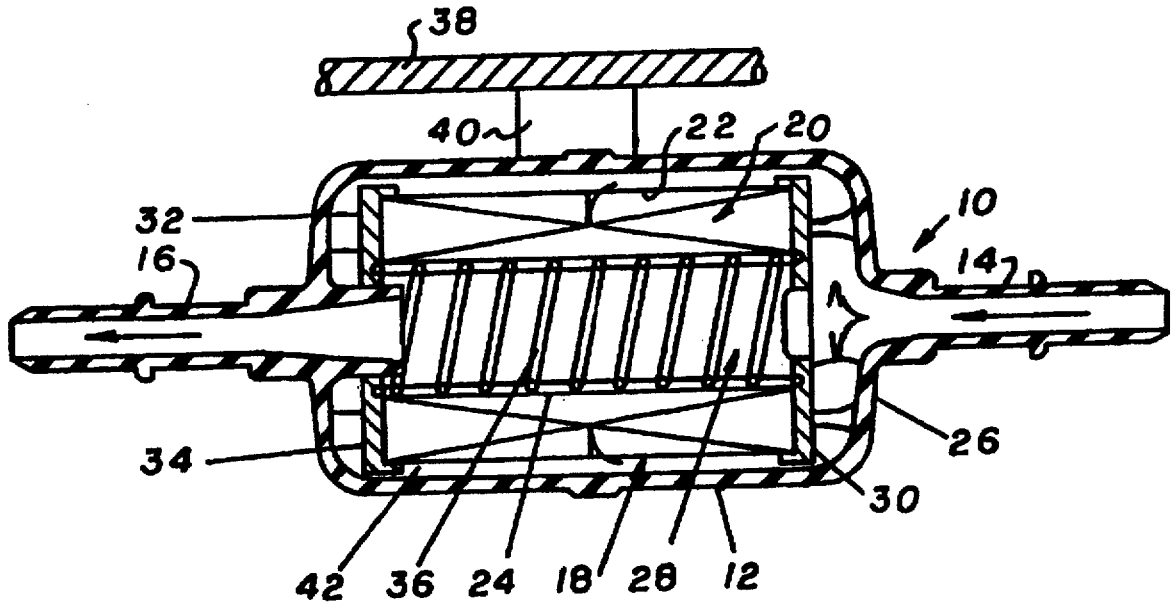

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-10 are determined to be patentable as amended.

New claims 11-30 are added and determined to be patentable.

1. [Method] *A method* of preventing material breakdown of a housing of a fuel *injection system fuel* filter for filtering fuel flowing through a fuel line [delivering] *that delivers* fuel to [the] *an* engine of a motor vehicle, said motor vehicle having a common electrical plane maintained at a common electrical potential, *and* said housing defining a chamber therewithin and having an inlet and an outlet connected [in] *with* said fuel line and communicating with said chamber, said housing being primarily composed of an electrically non-conductive material, *and said housing being supported by an electrically conductive bracket, said method* comprising the step of providing an electrically conductive path between the fuel within [the] *said* chamber and said common electrical plane *via said electrically conductive bracket* by providing electrically conductive material in [the] *said* electrically non-conductive material of said housing so that [the] *said* electrically conductive material extends completely through [the] *said* housing such that at least a portion of said electrically conductive path extends through [the] *said* housing to thereby prevent the build-up of electrostatic charge in the fuel and [resulting] *to prevent* arcing [which causes the] *that can cause a* breakdown of [the] *said* housing.

2. [Method of preventing material breakdown as claimed in] *A method according to* claim 1, wherein *a portion of* said electrically conductive path is provided by embedding [the] *said* electrically conductive material in [the] *said* electrically non-conductive material of said housing.

3. [Method of preventing material breakdown as claimed in] *A method according to* claim 1, wherein *a portion of* said electrically conductive path is provided by embedding [the] *electrically conductive fibers as said* electrically conductive material in [the form of electrically conductive fibers in the] *said* electrically non-conductive material of said housing.

4. [Method of preventing material breakdown as claimed in] *A method according to* claim 1, wherein said electrically non-conductive material is a polymer material and [the] *a portion of said* electrically conductive path is provided by embedding [the] *electrically conductive fibers as said* electrically conductive material in [the form of electrically conductive fibers in the] *said* polymer material *to form a composite material*.

5. [Method of preventing material breakdown as claimed in] *A method according to* claim 4, wherein said *electrically conductive* fibers are stainless steel fibers.

6. [Method of preventing material breakdown as claimed in] *A method according to* claim 5, wherein said stainless steel fibers comprise at least 3% to 9% by weight of [the] *said* composite material.

7. [Method of preventing material breakdown as claimed in] *A method according to* claim 6, wherein said stainless steel fibers have a minimum length of about 4 mm.

8. [Method of preventing material breakdown as claimed in] *A method according to* claim 4, wherein a filtering [media] *medium* within said chamber divides [the] *said* chamber into an inlet section communicated with said inlet and an outlet section communicated with said outlet, *and wherein* said electrically conductive path [extending between the fuel in] *extends between fuel within* said inlet section and [the] *said* common electrical plane *via said electrically conductive bracket*.

9. [Method of preventing material breakdown as claimed in] *A method according to* claim 2, wherein a filtering [media] *medium* within said chamber divides [the latter] *said chamber* into an inlet section communicated with said inlet and an outlet section communicated with said outlet, *and wherein* said electrically conductive path [extending between the fuel in] *extends between fuel within* said inlet section and [the] *said* common electrical plane *via said electrically conductive bracket*.

10. [Method of preventing material breakdown as claimed in] *A method according to* claim 1, wherein a filtering [media] *medium* within said chamber divides [the] *said* chamber into an inlet section communicated with said inlet and an outlet section communicated with said outlet, *and wherein* said electrically conductive path [extending between the fuel in] *extends between fuel within* said inlet section and 171 the] *said* common electrical plane *via said electrically conductive bracket*.

*11. A method of preventing material breakdown of a housing of a fuel injection system fuel filter for filtering fuel flowing through a fuel line that delivers fuel to an engine of a motor vehicle, the motor vehicle having a common electrical plane maintained at a common electrical potential, and the housing defining a chamber therewithin and having an inlet and an outlet connected with the fuel line and communicating with the chamber, the housing being primarily composed of an electrically non-conductive material, said method comprising the step of providing an electrically conductive path between the fuel within the chamber and the common electrical plane by providing electrically conductive material in the electrically non-conductive material of the housing so that the electrically conductive material extends completely through the housing, and by providing electrically conductive means between the housing and the common electrical plane such that the electrically conductive path extends through the housing and through the conductive means to thereby prevent the build-up of electrostatic charge in the fuel and to prevent arcing that can cause a breakdown of the housing.*

*12. A method according to claim 11, wherein a portion of the electrically conductive path is provided by embedding the electrically conductive material in the electrically non-conductive material of the housing.*

*13. A method according to claim 12, wherein a filtering medium within the chamber divides the chamber into an inlet section communicated with the inlet and an outlet* section communicated with the outlet, and wherein the electrically conductive path extends between fuel within the inlet section and the common electrical plane via the electrically conductive means.

14. A method according to claim 11, wherein a portion of the electrically conductive path is provided by embedding electrically conductive fibers as the electrically conductive material in the electrically non-conductive material of the housing.

15. A method according to claim 11, wherein the electrically non-conductive material is a polymer material and a portion of the electrically conductive path is provided by embedding electrically conductive fibers as the electrically conductive material in the polymer material to form a composite material.

16. A method according to claim 15, wherein the electrically conductive fibers are stainless steel fibers.

17. A method according to claim 16, wherein the stainless steel fibers comprise at least 3% to 9% by weight of the composite material.

18. A method according to claim 17, wherein the stainless steel fibers have a minimum length of about 4 mm.

19. A method according to claim 15, wherein a filtering medium within the chamber divides the chamber into an inlet section communicated with the inlet and an outlet section communicated with the outlet, and wherein the electrically conductive path extends between fuel within the inlet section and the common electrical plane via the electrically conductive means.

20. A method according to claim 11, wherein a filtering medium within the chamber divides the chamber into an inlet section communicated with the inlet and an outlet section communicated with the outlet, and wherein the electrically conductive path extends between fuel within the inlet section and the common electrical plane via the electrically conductive means.

21. A method of preventing material breakdown of a housing of a fuel injection system fuel filter for filtering fuel flowing through a fuel line that delivers fuel to an engine of a motor vehicle, the motor vehicle having a common electrical plane maintained at a common electrical potential, and the housing defining a chamber therewithin and having an inlet and an outlet connected with the fuel line and communicating with the chamber, the housing being primarily composed of an electrically non-conductive material, said method comprising the steps of:

providing an electrically conductive material in the electrically non-conductive material of the housing so that the electrically conductive material extends completely through the housing; and providing electrically conductive support means for supporting the housing, wherein an electrically conductive path is formed to extend from the fuel within the chamber, through the housing, through the electrically conductive support means, and to the common electrical plane to thereby prevent the build-up of electrostatic charge in the fuel and to prevent arcing that can cause a breakdown of the housing.

22. A method according to claim 21, wherein a portion of the electrically conductive path is provided by embedding the electrically conductive material in the electrically non-conductive material of the housing.

23. A method according to claim 22, wherein a filtering medium within the chamber divides the chamber into an inlet section communicated with the inlet and an outlet section communicated with the outlet, and wherein the electrically conductive path extends between fuel within the inlet section and the common electrical plane via the electrically conductive support means.

24. A method according to claim 21, wherein a portion of the electrically conductive path is provided by embedding electrically conductive fibers as the electrically conductive material in the electrically non-conductive material of the housing.

25. A method according to claim 21, wherein the electrically non-conductive material is a polymer material and a portion of the electrically conductive path is provided by embedding electrically conductive fibers as the electrically conductive material in the polymer material to form a composite material.

26. A method according to claim 25, wherein the electrically conductive fibers are stainless steel fibers.

27. A method according to claim 26, wherein the stainless steel fibers comprise at least 3% to 9% by weight of the composite material.

28. A method according to claim 27, wherein the stainless steel fibers have a minimum length of about 4 mm.

29. A method according to claim 25, wherein a filtering medium within the chamber divides the chamber into an inlet section communicated with the inlet and an outlet section communicated with the outlet, and wherein the electrically conductive path extends between fuel within the inlet section and the common electrical plane via the electrically conductive support means.

30. A method according to claim 21, wherein a filtering medium within the chamber divides the chamber into an inlet section communicated with the inlet and an outlet section communicated with the outlet, and wherein the electrically conductive path extends between fuel within the inlet section and the common electrical plane via the electrically conductive support means.

* * * * *